United States Patent [19]

Smalley et al.

[11] Patent Number: 4,718,812
[45] Date of Patent: Jan. 12, 1988

[54] WHEELCHAIR LIFT WITH POSITIVE AUTOMATIC HANDRAIL

[75] Inventors: Raymond L. Smalley; Melvin G. Risner, both of Carey, Ohio

[73] Assignee: REB Manufacturing, Inc., Carey, Ohio

[21] Appl. No.: 832,228

[22] Filed: Feb. 24, 1986

[51] Int. Cl.⁴ .............................................. B60P 1/44
[52] U.S. Cl. ...................................... 414/540; 296/61; 187/9 R; 182/113; 414/921; 14/69.5
[58] Field of Search ................ 14/69.5, 71.1, 71.3, 14/71.5, 71.7; 52/183; 182/113; 414/921, 539, 540, 541, 544, 545, 556, 558, 728, 742, 917, 749, 680; 187/9 R; 244/129.6, 118.3; 105/447, 487

[56] References Cited

U.S. PATENT DOCUMENTS

| 747,899 | 12/1903 | Wall . | |
|---|---|---|---|
| 1,639,879 | 8/1927 | Buttington | 296/61 |
| 3,710,962 | 1/1973 | Fowler, Jr. . | |
| 3,995,745 | 12/1976 | Chambers | 414/749 X |
| 4,056,203 | 11/1977 | Meldahl et al. . | |
| 4,113,121 | 9/1978 | Collins et al. . | |
| 4,121,695 | 10/1978 | Carpenter | 414/539 |
| 4,138,023 | 2/1979 | Rohrs et al. | 414/921 X |
| 4,214,849 | 7/1980 | Downing | 414/545 |
| 4,482,284 | 11/1984 | Robbins et al. | 414/539 |
| 4,627,784 | 12/1986 | Collins | 414/540 |

OTHER PUBLICATIONS

Collins Publication SP-1011-5M.

Primary Examiner—Frank E. Werner
Attorney, Agent, or Firm—Hugh Adam Kirk

[57] ABSTRACT

This concerns a wheelchair lift for a vehicle having upper and lower telescopic frames pivoted about an upper horizontal axis to swing out of the side of the vehicle. The lower telescopic frame is raised and lowered by sprocket chains connected around pulleys on a single hydraulic reciprocating motor anchored to the upper frame. A platform is horizontally pivoted to the lower telescopic frame for movement between a vertical and a horizontal position, either manually or by a separate reciprocating motor. The movement of the platform into its horizontal operating position also automatically swings the telescopic frames out from the side of the vehicle. The platform has pivoted along an orthogonal edge thereof a handrail which automatically raises from an inoperative position parallel to the platform when the platform is folded into its vertical inoperative position to an operative vertical position orthogonal to the platform when the platform is in its operative horizontal position. This motion is positively effected by an offset link connected between the base of the lower telescopic frame and a rotatable and axially slideable mounting axle of the handrail. Safety devices such as manual pump for the single lift hydraulic motor and locking slots on the ends of the cam for operating the handrail when in its operative position are also provided. An outer edge of the platform is provided with a ramp-barrier mechanism that acts as a ramp when the platform is in contact with the ground and the barrier when a platform is away from the ground.

9 Claims, 5 Drawing Figures

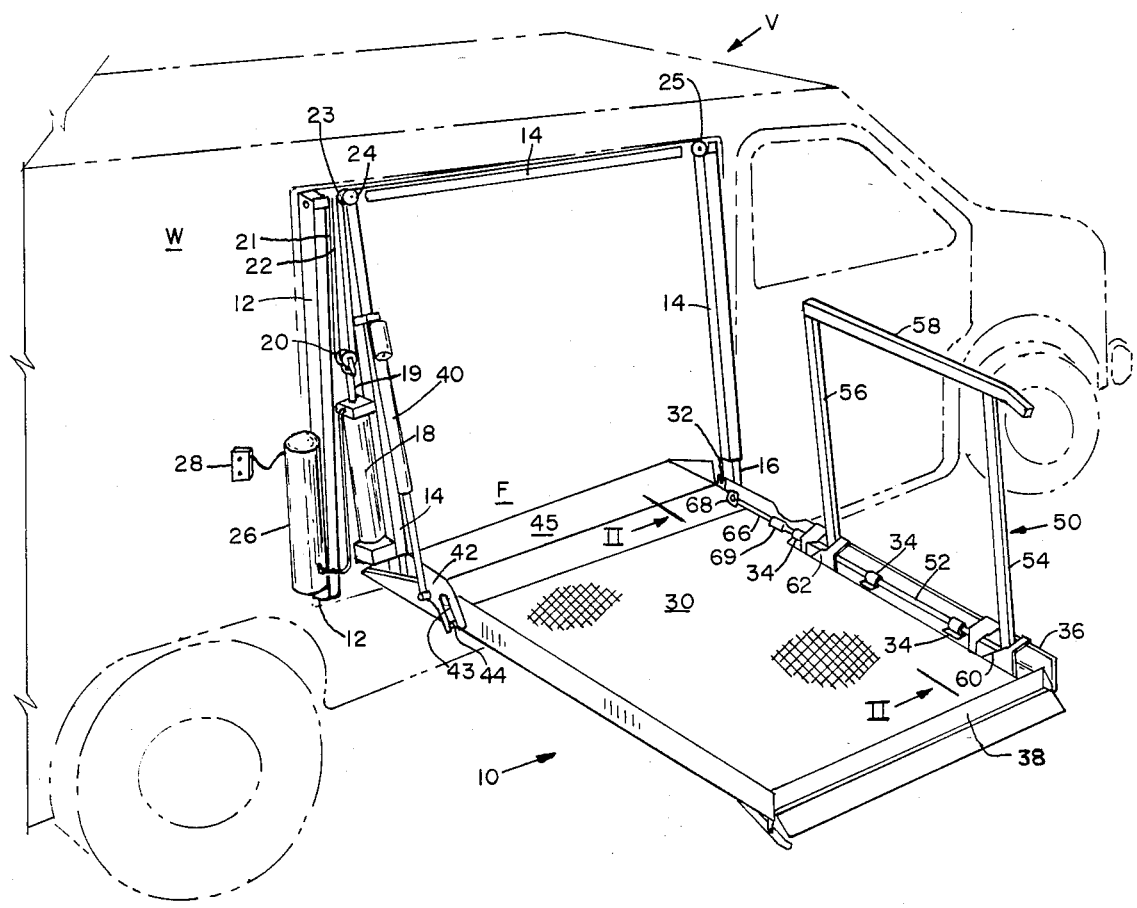

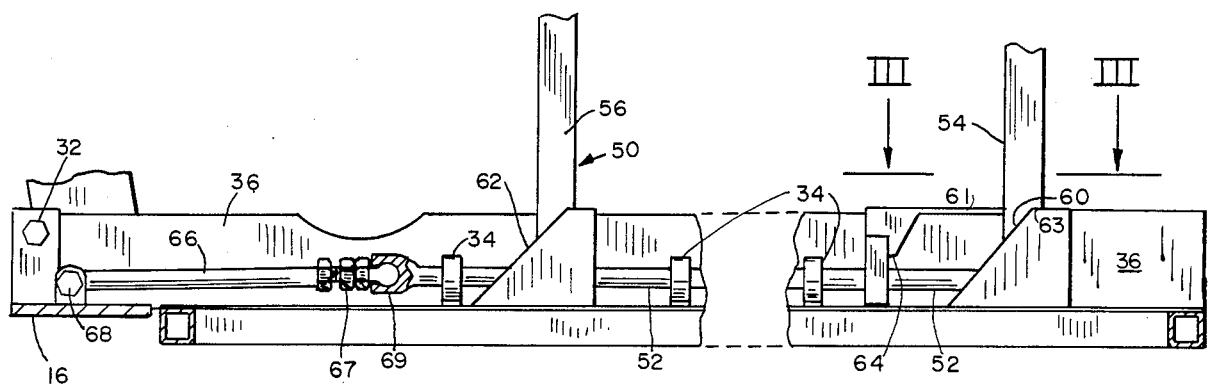
Fig II
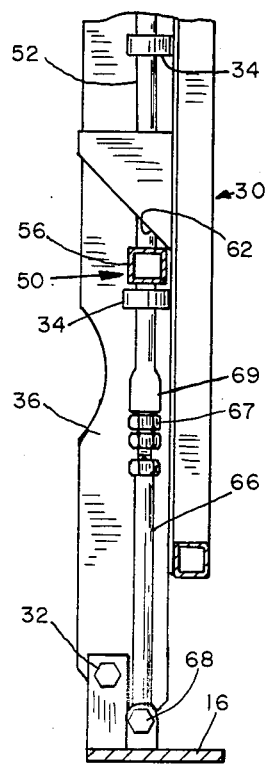
Fig V
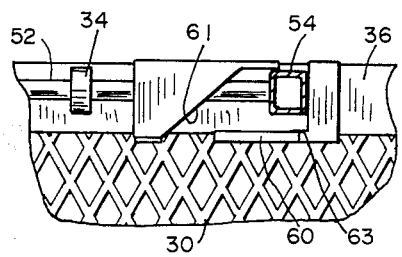
Fig III

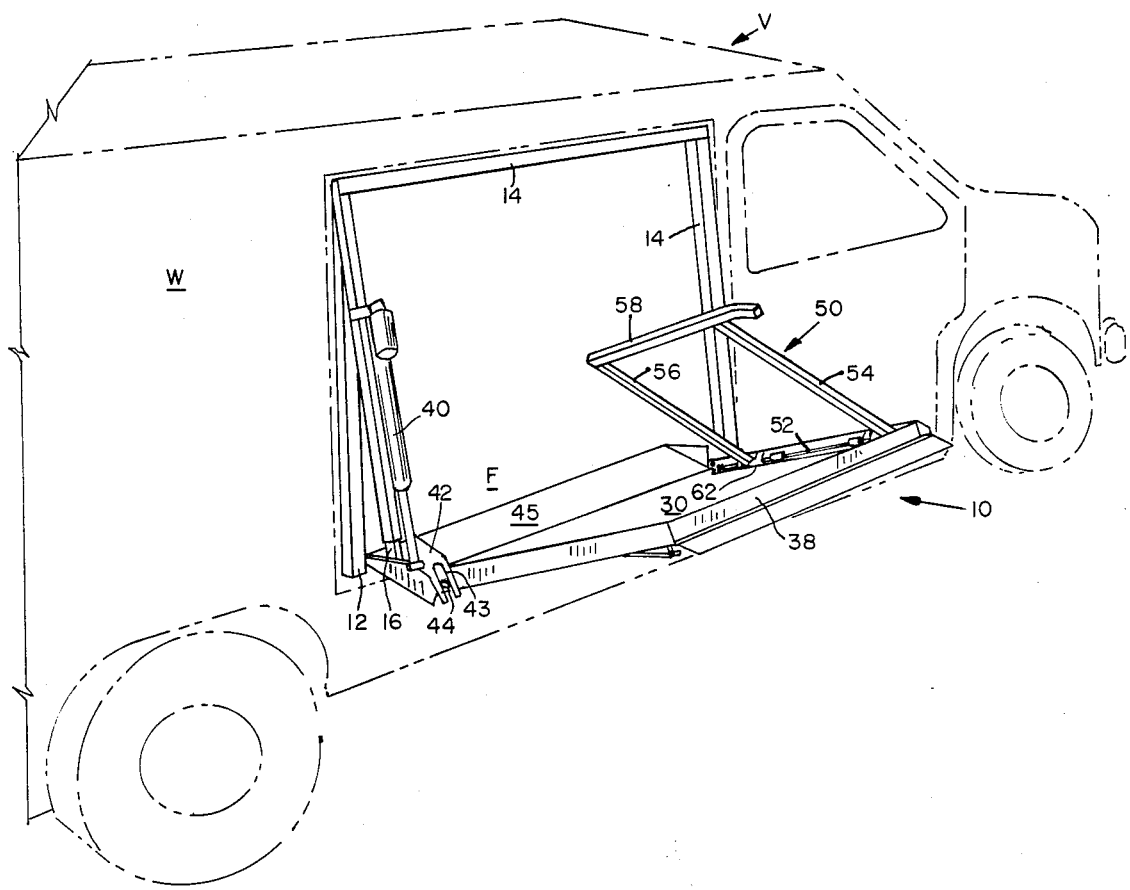
Fig IV

WHEELCHAIR LIFT WITH POSITIVE AUTOMATIC HANDRAIL

BACKGROUND OF THE INVENTION

Although wheelchair lifts for vehicles are known having some of the features of this invention, there is no known wheelchair lift which combines all these features in the specific way invented herein by applicants, nor is there known a positively operating handrail for wheelchair lifts which is positively operated into both its folded unfolded positions. Previously, such handrails were operated by complicated flexible or resilient means.

This invention is an improvement over applicants' assignee's prior U.S. Pat. No. 4,474,527 of Messrs. Risner, Sherman and Smalley issued Oct. 2, 1984, and prior U.S. Pat. No. 4,551,056 to Risner issued Nov. 5, 1985. The former patent deals primarily with a gravity-operated lift comprising upper and lower telescopic frames which swing outwardly from the wall of the vehicle around an upper horizontal axis, but does not disclose a handrail, not to mention an automatically operated one. The latter patent deals primarily with an automatic handrail, but it requires a spring for its operation and therefore is not positively operated in both directions.

SUMMARY OF THE INVENTION

Generally speaking, this wheelchair lift for a vehicle comprises a base frame mounted inside a side wall of the vehicle; an upper and lower telescopic frame pivoted horizontally to the top of the main frame; a platform pivoted horizontally to the lower telescopic frame foldable from a horizontal position into a vertical inoperative position parallel to the wall of the vehicle; and lastly, a positively operated automatic handrail along a side of the platform orthogonal to its pivotal axis, which handrail folds from an inoperative position against the surface of the platform into its operative vertical position when the platform unfolds into its horizontal position.

More specifically, the base frame comprises a U-shaped frame between the upper ends of which the telescopic frames are horizontally pivoted. Along one side of the upper telescopic frame is mounted a reciprocating motor, such as a hydraulic piston, which has a pair of pulleys mounted on the outer end of the piston. Around these pulleys a pair of cables or sprocket chains extend from a stationary position adjacent the upper pivotal axis of the telescopic frames on one side of these pulleys to down each vertical leg of the upper U-shaped telescopic frame to attach to the upper end of the lower U-shaped telescopic frame on the other side of these pulleys. Thus as the piston of the reciprocating motor is operated to retract the pair of pulleys thereon, the lower telescopic frame is raised, and when the power is shut off, the hydraulic piston acts as a damper to the force of gravity that lowers the lower telescopic frame and its platform.

Pivoted to the lower telescopic frame along a horizontal axis is an edge of a platform for a wheelchair, which has a combination barrier and ramp hinged at its outer end parallel to its pivot. Along one side a handrail is fixed to a rotatable and axially slidable shaft connected at its end by a link to an offset pivot on the lower telescopic frame spaced from the pivot of the platform. Thus, as the platform is folded and unfolded, the shaft mounting the handrail will be axially moved against a 45° cam to lower and raise, respectively, the handrail positively and automatically.

There may be provided a second reciprocating motor, such as a Saginaw-type ball and screw mechanism, mounted on the outside of the upper telescopic frame and connectable to a lever having a slot into which a pin on the platform is manually inserted for mechanically raising and lowering the platform from its inoperative to its operative positions. This slotted lever also operates additional linkage between the platform and the base frame of the lift in the vehicle for swinging the lower end of the telescopic frames out of the vehicle wall and lowering the bridging plate between the floor of the vehicle and the edge of the platform when the platform is raised and lowered either manually or by the second reciprocating motor.

Mounted on the base frame is a hydraulic motor, pump, and control box with three-way electrical switches for controlling the reciprocating lift motor mounted on the side of the upper telescopic frame, and also the reciprocating motor for the platform if not manually operated.

Objects and Advantages

It is an object of this invention to produce an efficient effective, economic and simple vehicle lift for invalids and wheelchairs.

Another object is to produce such a lift mechanism which is at least partially gravity-operated and may be at least partially manually operated in order to save power.

Another object is to produce such a lift which has a handrail that is automatically and positively moved from its inoperative to its operative position, and being locked therein.

BRIEF DESCRIPTION OF THE VIEWS

The above mentioned and other features, objects and advantages, and the manner of attaining them are described more specifically below by reference to an embodiment of this invention shown in the accompanying drawings, wherein:

FIG. I is a perspective view of a preferred embodiment of the wheelchair lift of this invention showing in dotted lines the vehicle side wall on which it is mounted, and showing the platform of the lift in its horizontal operative upper position flush with the floor of the vehicle and parts of the upper frame broken away to show the pulleys at its ends;

FIG. II is an enlarged view taken along lines II—II of FIG. I, with central parts thereof being broken away, showing the slideable shaft for mounting the handrail and its adjacent cams;

FIG. III is a section taken along lines III—III of FIG. II at right angles to one of the cams;

FIG. IV is a perspective view similar to that of FIG. I, but showing the platform in its partially folded and inoperative position; and FIG. V is a view of the lift half of FIG. II, but showing the handrail in its inoperative position parallel to the surface of the platform.

DETAILED DESCRIPTION OF PREFERRED EMBODIMENT

The Lift

In FIGS. I and IV there is shown in dot-dash lines the outline of a van-type vehicle V into a side wall W of which is mounted the wheelchair lift assembly 10 of this invention, which assembly comprises a stationary base frame 12 anchored in the wall W and floor F of the vehicle V. Between the upper legs of the main base frame 12 there is horizontally pivoted the swingable upper telescopic frame 14 (with corners broken away in FIG. I to show pulleys 23, 24 and 25) into the open lower hollow leg ends of which telescopic the upper ends of the lower telescopic frame 16. Mounted along one of the vertical legs 12 of the upper horizontal frame 14 is a reciprocating motor such as a hydraulic cylinder 18. The upper end of the piston 19 and cylinder 18 has mounted a pair of pulleys 20 around which extend two separate parallel sprocket chains or flexible cables 21 and 22. One end of each cable 21 and 22 is anchored to the upper end of the adjacent leg of the upper telescopic frame 14 and both cables pass around the pair of pulleys 20 and back over pulleys 23 and 24 at the upper end of the adjacent vertical leg of the upper horizontal frame 14. One of these cables 21 and 22 extends down and is attached to the upper end of the adjacent leg of the lower telescopic frame 16, and the other cable extends across the top of the upper telescopic frame to another pulley 25 and thence down to the other upper end of the lower telescopic frame 16. Thus, as the reciprocating motor 18 is operated to retract its piston 19 downwardly, it will simultaneously raise both parallel vertical legs of the lower telescopic frame 16 from the ground-engaging position to the position level with the floor of the vehicle as shown in FIG. I. When the power is cut off from the piston 18, then a valve, in combination with an accumulator in a motor and pump housing 26 mounted on the stationary frame 12, will dampen the downward gravity pull on the lower telescopic frame 16 and its platform 30. The valve for controlling the hydraulic pressure to and from the one end of the piston 18 may be electrically controlled from a control box 28 which may have two three-way switches on it, one for up and down movement and stopping of the reciprocating motor 18, and the other for in and out movement and stopping of an optional reciprocating motor 40 attached to the outside of the upper telescopic frame. This optional motor 40 may be manually engaged for folding and unfolding the platform 30. Between the motor pump accumulator assembly 26 and the hydraulic reciprocating motor 18, there may be provided a manually operated pump (not shown) to operate the lift in the event that there is no electric power for operating the motor in the assembly 26, so that an invalid would not become restrained in an undesired position of the lift.

The Platform

The auxiliary or secondary reciprocating motor 40 is connected to a pivoted lever 42 having a cam slot 43 into which a manually operable pin 44 on the underside of the platform 30 is engageable when power operation of the platform is desired. The movement of the platform from its vertical inoperative position into its horizontal operative position swings the telescopic frames 14 and 16 outwardly from the wall W of the vehicle V by means of a pair of links (not shown) which also unfold the plate 45 for bridging the gap between the inner edge of the swing-out platform 30 and the floor F of the vehicle V. This link and slotted lever mechanism is more clearly described in the applicants' assignee's above mentioned U.S. Pat. No. 4,474,527 issued Oct. 2, 1984. Thus, whether the platform 30 is manually pulled from its vertical inoperative position into its horizontal operative position shown in FIG. I, or is moved by the reciprocating motor 40, the unfolding of the platform from its vertical to its horizontal operative position simultaneously swings the telescopic frames 14 and 16 outwardly from the wall W of the vehicle V into the operative position shown in FIG. I. A handle (not shown) may be provided under the platform 30 for easing its manual operation.

At the opposite end of the platform 30 from its hinged connection 32 (see also FIGS. II and V), there is provided a hinged barrier and ramp 38 which may be similar to that described in applicants' assignee's U.S. Pat. No. 4,480,719 issued Nov. 6, 1984.

The Positive Automatic Handrail

The positive automatic handrail 50 shown in its entirety in FIGS. I and IV comprises herein a rectangular frame composed of a lower mounting shaft 52, a pair of uprights or vertical posts 54 and 56 rigidly attached to the shaft 52, and parallel to the shaft 52 an upper handrail section 58. The shaft 52 is journalled in a plurality of bearings 34 mounted inside along one L-shaped flange 36 of one side of the platform 30 between its pivot 32 and its barrier ramp assembly 38. These bearings 34 permit both rotatable and axial movement of the shaft 52 journalled therein. Around the lower ends of each of the legs 54 and 55 of the handrail assembly adjacent the shaft 52 are cams 60, 61 and 62 having cam surfaces at a 45° angle to the axis of the shaft 52 and that engage the lower ends of the vertical posts 54 and 56 of the handrail assembly 50. These 45° angle surfaces guide the lower ends of these posts 54 and 56 so that as the shaft 52 reciprocates axially, the handrail assembly 50 rotates from the vertical operative position shown in FIGS. I and II to a horizontal or inoperative position parallel to the flat surface of the platform 30 shown in FIG. V and vice versa. At the ends of the cam surfaces 60, 61, and 62 there are provided short straight edges 63 and 64 parallel to the shaft 52 for locking the handrail 50 in its end positions (see FIGS. II and III). This axial movement of the shaft 52 is provided by the swivel link 66 (see FIGS. I, II and V), which link is pivoted at 68 to the base of the lower telescopic frame 16 offset from the pivot 32 of the platform 30 so that there is an axial movement transmitted through the link 66 to the shaft 52 as the platform is hinged about its pivot 32. At the opposite end of the link 66 from its pivot 68 is provided threads and nuts 67 for an axially adjustable swivel connection 69 which permits adjustment of the link 66 with respect to the end of the shaft 52 and also permits rotation of the shaft 52 relative to the link 66, since the link 66 does not rotate about its longitudinal axis. Because of this specific positive connection, the oscillation of the platform 30 about the pivot 32 correspondingly positively pushes and pulls the link 66 to operate on the adjacent end of rod or shaft 52 for both axially and rotatively moving said shaft 52 which correspondingly, due to the 45° cam surfaces 60, 61 and 62, raises and lowers the handrail 50 simultaneously with the lowering and raising, respectively, of the platform 30.

Although the specific embodiment of this invention shows the handrail to be a rectangular frame, other configurations may be employed without departing from the scope of this invention. Similarly, other platforms and operations thereof may be employed for the positively operated handrail 50 of this invention without the necessity of using the specific single lift reciprocating motor 18. However, it has been found that the simplicity and economy of the particular gravity-operated lift mechanism disclosed herein has practical advantages when used in combination with the simple positively operated handrail mechanism 50 of this invention.

While there is described above the principles of this invention in connection with specific apparatus, it is to be clearly understood that this description is made only by way of example and not as a limitation to the scope of this invention.

We claim:

1. A positively folded and unfolded handrail for a foldable platform of a lift comprising:
   (A) a substantially vertically movable platform supporting member,
   (B) a platform having a support surface and being pivoted along one of its edges to said member for movement between an inoperative vertical position to an operative horizontal position,
   (C) a handrail having a support means rigidly attached to a slidable and pivotable shaft means at its lower end along another edge of said platform orthogonal to said one edge pivot for said platform, said handrail moving between an inoperative position parallel to said supporting surface of said platform when said platform is in its inoperative position and an operative position orthogonal to said supporting surface when said platform is in its operative position, and
   (D) means for positively moving said handrail with both the folding and unfolding pivotal movement of said platform comprising:
      (1) means for journalling said shaft means for both oscillatory and reciprocal movement along said orthogonal other edge of said platform,
      (2) cam means engageable with said support means for said handrail, and
      (3) rod means coaxial with said shaft means journalled at one end to the end of said shaft means adjacent said handrail support means and pivoted at its other end to said platform supporting member adjacent the axis of the pivot of said platform for positively reciprocating said shaft means to follow said came means and also to oscillate said shaft means positively to raise and lower said handrail.

2. A handrail according to claim 1 wherein said cam means include a positive lock notch for the handrail in its operative position.

3. A handrail according to claim 1 wherein said rod means is axially adjustable in length with respect to its pivot and said one end of said shaft means.

4. A handrail according to claim 1 having a general rectangular configuration in which said handrail support means comprise parallel vertical posts when the handrail is in operative position.

5. A handrail according to claim 1 wherein said platform supporting member comprises a lower telescopic frame member.

6. An optional manual, gravity, and power operated wheelchair lift comprising:
   (A) an outer inverted U-shaped frame having depending hollow legs,
   (B) an inner U-shaped frame having legs with upper ends telescoping into the dependng hollow legs of said outer frame,
   (C) a first reciprocating piston motor means mounted on said outer frame having a pair of sprocket wheels connected to the outer upper end of its piston,
   (D) a pair of sprocket chains anchored at one end to said outer frame and at said other end to the upper ends of said telescoping inner frame after passing around said pair of sprocket wheels on said piston for raising said inner frame,
   (E) a foldable platform pivoted to the lower end of said inner frame,
   (F) a second reciprocating piston motor mounted on said outer frame for engagement with said platform for folding and unfolding said platform,
   (G) manual means to engage and disengage said second motor with said platform,
   (H) a foldable handrail rigidly mounted on a shaft which shaft is slidable and pivoted along one side of said platform, the shaft being the sole support for the handrail,
   (I) means pivoted to said lower frame adjacent the pivot for said platform for positively reciprocating said shaft, and
   (J) cam means for positively oscillating said shaft for folding and unfolding said handrail with the folding and unfolding of said platform.

7. A lift according to claim 6 wherein said cam means includes a positive locking notch for the handrail in its unfolded position.

8. A lift according to claim 6 wherein said handrail has a general rectangular configuration having parallel vertical posts which engage said cam means.

9. A wheelchair lift according to claim 6 wherein said platform includes a barrier ramp along its outer edge opposite that of its pivot to the lower end of said inner frame.

* * * * *

UNITED STATES PATENT AND TRADEMARK OFFICE
CERTIFICATE OF CORRECTION

PATENT NO. : 4,718,812
DATED : January 12, 1988
INVENTOR(S) : Raymond L. Smalley et al It is certified that error appears in the above-identified patent and that said Letters Patent are hereby corrected as shown below:

In the Abstract, next-to-last line (line 28), change "the" to -- a --.

Column 1, line 12, after "folded" insert -- and --.

Column 2, line 66, change "lift" to -- left --.

Column 3, line 14, change "telescopic" to -- telescope --.

Signed and Sealed this

Nineteenth Day of July, 1988

Attest:

DONALD J. QUIGG

Attesting Officer

Commissioner of Patents and Trademarks